United States Patent
Fuchs et al.

(10) Patent No.: US 12,321,844 B2
(45) Date of Patent: Jun. 3, 2025

(54) AI-BASED KEYWORK PREDICTIONS FOR TITLES

(71) Applicant: eBay Inc., San Jose, CA (US)

(72) Inventors: Gilad Eliyahu Fuchs, Kfar-Saba (IL); Yoni Acriche, Austin, TX (US)

(73) Assignee: EBAY INC., San Jose, CA (US)

( * ) Notice: Subject to any disclaimer, the term of this patent is extended or adjusted under 35 U.S.C. 154(b) by 695 days.

(21) Appl. No.: 16/782,945

(22) Filed: Feb. 5, 2020

(65) Prior Publication Data
US 2021/0241073 A1 Aug. 5, 2021

(51) Int. Cl.
*G06F 40/166* (2020.01)
*G06N 3/042* (2023.01)
*G06N 3/08* (2023.01)

(52) U.S. Cl.
CPC .......... *G06N 3/042* (2023.01); *G06F 40/166* (2020.01); *G06N 3/08* (2013.01)

(58) Field of Classification Search
CPC .......... G06N 3/02; G06N 3/04; G06N 3/0427; G06N 3/08; G06N 20/00; G06N 3/042; G06F 16/00; G06F 16/20; G06F 16/24; G06F 16/245; G06F 16/2457; G06F 16/24578; G06F 16/30; G06F 16/33; G06F 16/34; G06F 16/3322; G06F 16/3325; G06F 16/3326; G06F 16/3329; G06F 16/345; G06F 16/90; G06F 16/95; G06F 16/951; G06F 16/953; G06F 16/9535; G06F 40/00; G06F 40/10; G06F 40/166; G06F 40/20; G06F 40/205; G06F 40/279; G06F 40/284; G06F 40/289; G06F 40/295; G06F 40/40; G06F 40/42; G06F 40/44; G06Q 30/00; G06Q 30/02; G06Q 30/06
USPC ....................................................... 707/723
See application file for complete search history.

(56) References Cited

U.S. PATENT DOCUMENTS

| | | | |
|---|---|---|---|
| 7,970,754 B1 * | 6/2011 | Jarboe | G06Q 30/02 |
| | | | 707/706 |
| 8,494,897 B1 * | 7/2013 | Dawson | G06Q 30/02 |
| | | | 705/14.42 |
| 8,954,424 B2 | 2/2015 | Gupta et al. | |
| 9,330,168 B1 * | 5/2016 | Brown | G06F 16/355 |
| 2007/0112764 A1 * | 5/2007 | Yih | G06F 16/313 |
| | | | 707/999.005 |
| 2015/0154294 A1 * | 6/2015 | Kamdar | G06Q 30/02 |
| | | | 707/709 |
| 2017/0060928 A1 * | 3/2017 | Kenthapadi | G06F 16/23 |
| 2017/0337211 A1 * | 11/2017 | Netsch | G16H 10/20 |
| 2017/0364988 A1 | 12/2017 | Gupta et al. | |

* cited by examiner

*Primary Examiner* — Thierry L Pham
(74) *Attorney, Agent, or Firm* — SCHWEGMAN LUNDBERG & WOESSNER, P.A.

(57) ABSTRACT

Systems and methods for managing keyword predictions for proposed titles are provided. In example embodiments, a network system receives, from a user during a publication creation process, a proposed title for a publication associated with an item. The proposed title includes a plurality of tokens, whereby the plurality of tokens comprises at least all non-stock words in the proposed title. Based on the proposed title, the network system identifies an importance of each token of the plurality of tokens in the proposed title. The network system then causes presentation of a user interface that visually indicates the importance of each token of the plurality of tokens in the proposed title.

20 Claims, 6 Drawing Sheets

AI-BASED KEYWORK PREDICTIONS FOR TITLES

TECHNICAL FIELD

The subject matter disclosed herein generally relates to machines configured to perform predictions, and to technologies by which such special-purpose machines become improved compared to other machines that perform predictions. Specifically, the present disclosure addresses systems and methods that manage artificial intelligence-based (AI-based) keyword predictions for titles of publications.

BACKGROUND

Oftentimes, a user does not use an optimized title for their publication. This may be a result of the fact that the user is not sure which search tokens (keywords) in their title will drive traffic to their publication. This is even more evident for new publications, which do not have any search history on a website. If the titles are not optimized, then search queries searching for an item or content associated with a publication may not be easily found.

BRIEF DESCRIPTION OF DRAWINGS

Various ones of the appended drawings merely illustrate example embodiments of the present invention and cannot be considered as limiting its scope.

DETAILED DESCRIPTION

The description that follows includes systems, methods, techniques, instruction sequences, and computing machine program products that embody illustrative embodiments of the present inventive subject matter. In the following description, for purposes of explanation, numerous specific details are set forth in order to provide an understanding of various embodiments of the inventive subject matter. It will be evident, however, to those skilled in the art, that embodiments of the inventive subject matter may be practiced without some or other of these specific details. In general, well-known instruction instances, protocols, structures, and techniques have not been shown in detail. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

Various systems and methods for managing artificial intelligence-based (AI-based) title prediction are discussed herein. In example embodiments, a network system receives from a user during a publication creation process, a proposed title for a publication associated with an item or content. The proposed title includes a plurality of tokens, whereby the plurality of tokens comprises at least all non-stock words in the proposed title. Based on the proposed title, the network system performs analysis using a prediction model to identify an importance of each token of the plurality of tokens in the proposed title. The network system then causes presentation of a user interface that visually indicates the importance of each token of the plurality of tokens in the proposed title. The user interface may also provide a suggestion of one or more alternative tokens to be added to the proposed title and/or a suggestion of one or more tokens to be removed from the proposed title.

Accordingly, the present disclosure provides, in one embodiment, a technical solution to the technical problem of efficiently providing search results for publications. By improving titles of publications that are searched, the search process, itself, is improved. That is, for example, less searches may need to be performed to find appropriate publications that satisfy a search query when such search systems base matches on titles of the publications. As a result, resources used by one or more machines, databases, or devices (e.g., within an environment) may be reduced for such search systems. Examples of such computing resources include processor cycles, network traffic, memory usage, data storage capacity, power consumption, network bandwidth, and cooling capacity.

Figure 1:
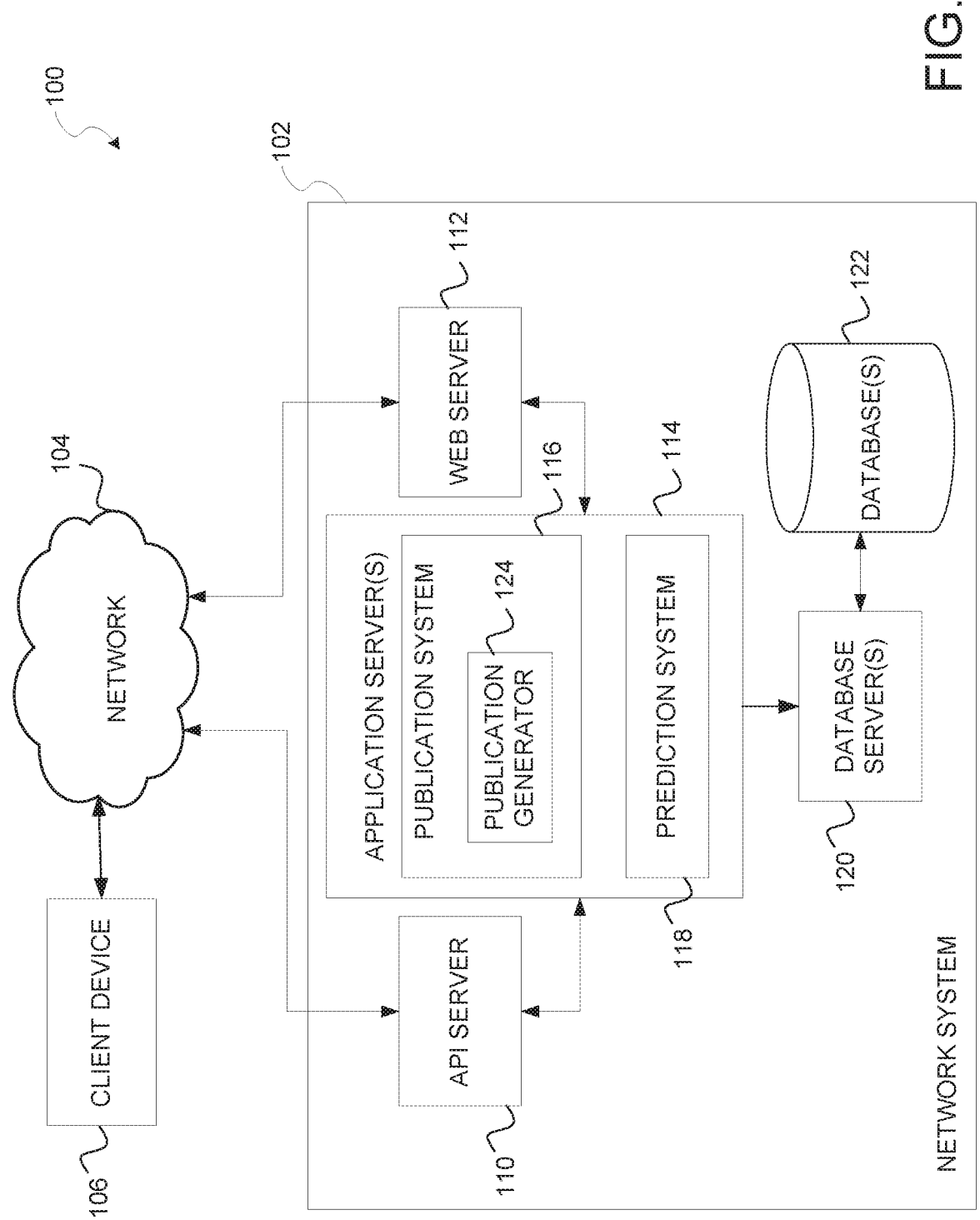
FIG. 1 is a diagram illustrating a network environment suitable for providing an AI-based keyword prediction system for titles, according to some example embodiments.

With reference to FIG. 1, an example embodiment of a network environment 100 that provides a system for managing artificial intelligence-based (AI-based) title prediction is shown. A network system 102 provides server-side functionality via a communication network 104 (e.g., the Internet, wireless network, cellular network, or a Wide Area Network (WAN)) to client device 106. In example embodiments, the client device 106 is a device of a user that is generating a publication with the network system 102.

The client device 106 interfaces with the network system 102 via a connection with the network 104. Depending on the form of the client device 106, any of a variety of types of connections and networks 104 may be used. For example, the connection may be Code Division Multiple Access (CDMA) connection, a Global System for Mobile communications (GSM) connection, or another type of cellular connection. Such a connection may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, or other data transfer technology (e.g., fourth generation wireless, 4G networks). When such technology is employed, the network 104 may include a cellular network that has a plurality of cell sites of overlapping geographic coverage, interconnected by cellular telephone exchanges. These cellular telephone exchanges may be coupled to a network backbone (e.g., the public switched telephone network (PSTN), a packet-switched data network, or other types of networks).

In another example, the connection to the network 104 may be a Wireless Fidelity (Wi-Fi, IEEE 802.11x type) connection, a Worldwide Interoperability for Microwave Access (WiMAX) connection, or another type of wireless data connection. In such an embodiment, the network 104 may include one or more wireless access points coupled to a local area network (LAN), a wide area network (WAN), the Internet, or another packet-switched data network. In yet another example, the connection to the network 104 may be a wired connection (e.g., an Ethernet link), and the network 104 may be a LAN, a WAN, the Internet, or another packet-switched data network. Accordingly, a variety of different configurations are expressly contemplated.

In various embodiments, the data exchanged within the network environment 100 may be dependent upon user-selected functions available through one or more client or user interfaces (UIs). The UIs are associated with the client device 106 executing a web client (e.g., an Internet browser), which may be in communication with the network system 102. The UIs may also be associated with one or more applications (e.g., an application provided by or through the network system 102).

The client device 106 may comprise, but is not limited to, a smartphone, tablet, laptop, multi-processor systems, microprocessor-based or programmable consumer electronics, game consoles, set-top boxes, a server, or any other communication device that a user may utilize to access the network system 102. In some embodiments, the client device 106 comprises a display module (not shown) to display information (e.g., in the form of user interfaces). In further embodiments, the client device 106 comprises one or more of a touch screen, accelerometer, camera, microphone, and Global Positioning System (GPS) device.

The client device 106 may include one or more applications (also referred to as "apps") such as, but not limited to, a web browser, messaging application, electronic mail (email) application, a network system application (associated with the network system 102), third-party applications, and the like. In some embodiments, if a site application (e.g., the network system application) is included in the client device 106, then this application is configured to locally provide the user interface and at least some of the functionalities with the application configured to communicate with the network system 102, on an as needed basis, for data or processing capabilities not locally available (e.g., to publish publications or listings, access a database of published publications or listings, to authenticate a user, to provide communications with other users of the network system 102). Conversely if the site application is not included in the client device 106, the client device 106 may use its web browser to access a site (or a variant thereof) hosted on the network system 102.

Turning specifically to the network system 102, an application program interface (API) server 110 and a web server 112 are coupled to, and provide programmatic and web interfaces respectively to, one or more application servers 114. The application servers 114 host a publication system 116 and a prediction system 118, each of which may comprise one or more modules, applications, or engines, and which can be embodied as hardware, software, firmware, or any combination thereof. The application servers 114 are, in turn, coupled to one or more database servers 120 that facilitate access to one or more information storage repositories or databases 122. In one embodiment, the database 122 is a storage device that stores content (e.g., publications or listings, user profiles including past browsing and search histories and publications selected) that is used by the network system 102.

In example embodiments, the publication system 116 publishes content on a network (e.g., Internet). As such, the publication system 116 provides a number of publication functions and services to users (e.g., a user of the client device 106; users at other devices searching for publications) that access the network system 102. For example, the publication system 116 can host a marketplace application that provides a number of functions and services to users, such as publishing listing whereby a user (e.g., a seller) may list (or publish information concerning) goods or services (also referred to as "items") for sale, a potential user or buyer can express interest in or indicate a desire to purchase such goods or services, and a transaction pertaining to the goods or services is processed. However, it is noted that the publication system 116 may, in alternative embodiments, be associated with a non-marketplace environment such as an informational environment (e.g., search engine) or social networking environment that publishes articles or other types of publications.

In example embodiments, the publication system 116 includes a publication generator 124. The publication generator 124 allows the user to author publications that they wish to publish via the networked system 102. In example embodiments, the publication generator 124 works with the prediction system 118 to generate the publication using a proposed title that is analyzed by the prediction system 118.

In example embodiments, the publication generator 124 causes presentation of one or more user interfaces to allow the user at the client device 106 to author the publication. Using the user interface, the user can upload an image, provide a proposed title, and provide content (e.g., description of the image) for the publication. Once the publication generator 124 receives this information, the publication generator 202 works with the prediction system 118 to refine the proposed title. Once the proposed title is refined (or accepted by the user), the publication generator 124 generates the publication. The publication may be stored to a datastore (e.g., the database 122) and published on the network.

While the publication generator 124 is shown as being a part of the publication system 116, the publication generator 124 may, alternatively, be located within the prediction system 118. It is noted that the publication system 116 comprises other components (not shown) that are not directly related to example embodiments and are, therefore, not discussed herein.

The prediction system 118 comprises one or more servers that manage generation of a prediction model and application of the prediction model to proposed titles for publications. The prediction system 118 will be discussed in more detail in connection with FIG. 2 below.

While the publication system 116 and prediction system 118 are shown in FIG. 1 to form part of the network system 102, it will be appreciated that, in alternative embodiments, the publication system 116 or prediction system 118 may form part of a separate service that is distinct from the network system 102. Further still, one or more components of the prediction system 118 may, alternatively, be located within the publication system 116 or vice-versa. Furthermore, while the client-server-based network environment 100 shown in FIG. 1 employs a client-server architecture, the present inventive subject matter is of course not limited to such an architecture and could equally well find application in a distributed or peer-to-peer architecture system, for example. The publication system 116 and prediction system 118 can also be implemented as standalone software programs, which do not necessarily have networking capabilities.

In example embodiments, any of the systems, servers, or devices (collectively referred to as "components") shown in, or associated with, FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed below with respect to FIG. 6, and such a special-purpose computer may accordingly be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Moreover, any two or more of the systems, servers, or devices illustrated in FIG. 1 may be combined into a single system, server, or device, and the functions described herein for any single system, server, or device may be subdivided among multiple systems or devices. Additionally, any number of network systems 102, networks 104, and client devices 106 may be embodied within the network environment 100. Furthermore, some components or functions of the network environment 100 may be combined or located elsewhere in the network environment 100.

Figure 2:
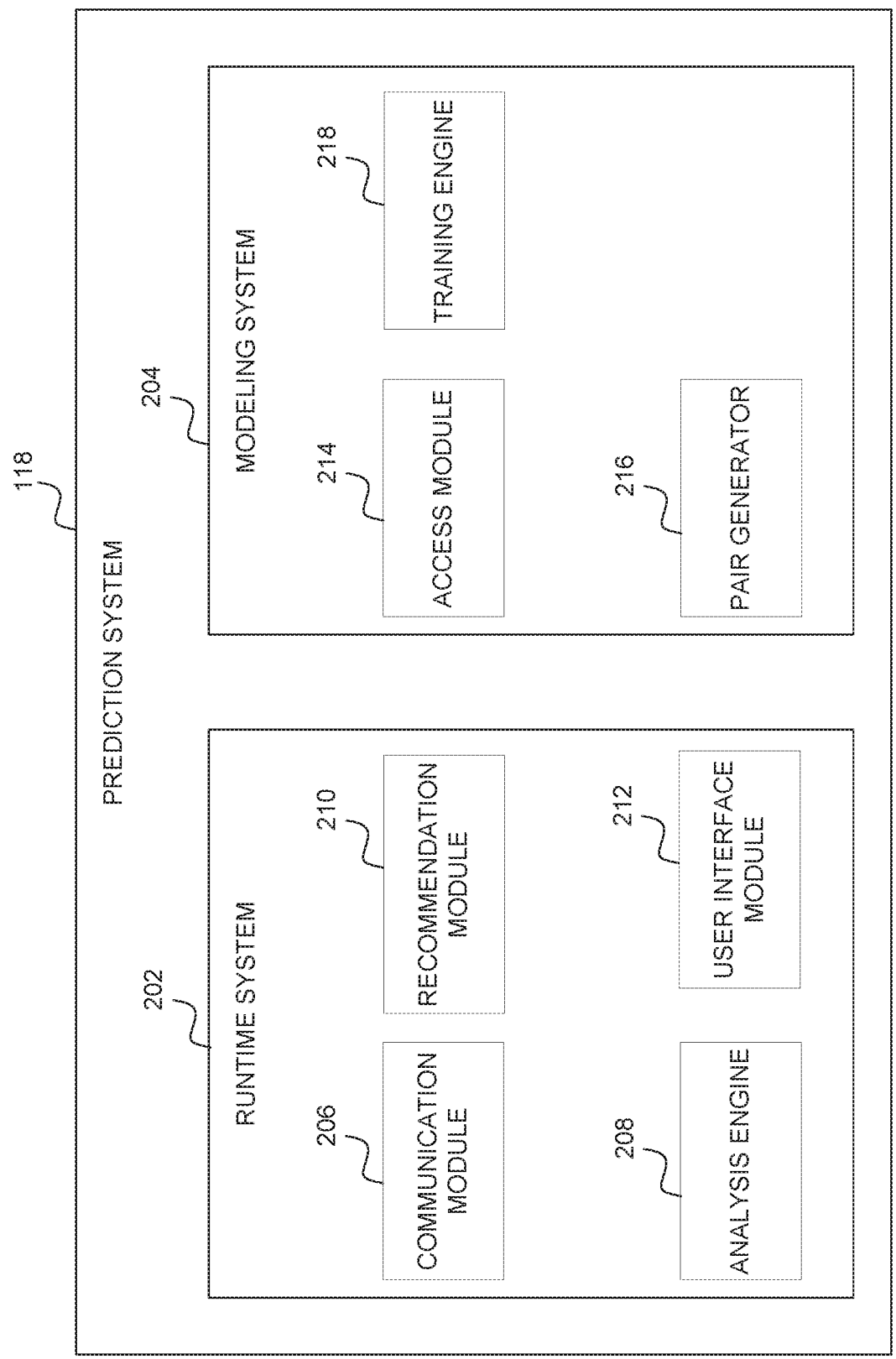
FIG. 2 is a block diagram illustrating components of a prediction system, according to some example embodiments.

FIG. 2 is a block diagram illustrating components of the prediction system 118, according to some example embodiments. In example embodiments, the prediction system 118 comprises one or more servers that include components that manage generation of a prediction model and application of the prediction model to proposed titles for new publications. To enable these operations, the prediction system 118 comprises a runtime system 202 and a modeling system 204. The runtime system 202 performs analysis of a proposed title received from the publication generator 124 in real-time. In example embodiments, the analysis is performed using a prediction model that is maintained (e.g., generated and updated) by the modeling system 204.

In example embodiments, the runtime system 202 performs analysis of a proposed title for a publication that is received from the publication generator 124 and provides feedback on the proposed title and/or suggestions for improving the proposed title. To enable these operations, the runtime system 202 comprises a communication module 206, an analysis engine 208, a recommendation module 210, and a user interface module 212.

The communication module 206 manages communications with the publication generator 124 and the network 104. In various embodiments, the communication module 206 receives, from the publication generator 124, a proposed title for a new publication associated with an item that is being generated. The communication module 206 then presents the proposed title to the analysis engine 208. In some cases, the proposed title is for a publication or listing to sell the item. The proposed title typically is composed of a plurality of words including stock words. Stock words may include articles (e.g., a, an, the), prepositions (e.g., to, at), and conjunctions (e.g., and, or). Upon removal of the stock words from the proposed title, the remaining one or more words are keywords also referred to as tokens.

The analysis engine 208 applies a prediction model to the one or more tokens of the proposed title and identifies an importance of each token in the proposed title. In example embodiments, the importance of each token is based on a probability that other users of the network system will include the tokens in their search query for items similar to the item associated with the publication being generated. The probability (also referred to as a "probability score") is determined, in one embodiment, by applying the prediction model maintained by the modeling system 204. The analysis also takes into consideration structure (e.g., position) and context of each token relative to each other (e.g., relationships between the tokens). Further details of the analysis engine 208 and its operations will be discussed in more detail in connection with FIG. 4 below.

The recommendation module 210 determines and provides recommendations for improving the proposed title. In some cases, the recommendation module 210 recommends one or more tokens that have a higher probability of being included in a search query for similar items/content than one or more of the tokens in the proposed title. In other cases, the recommendation module 210 may suggest removing one or more tokens in the proposed title that have a low probability. For example, the recommendation module 210 may suggest tokens be removed that have a probability below a predetermined threshold. Further still, the recommendation module 210, in some embodiments, may provide a recommendation to rearrange tokens in the proposed title.

The user interface (UI) module 212 generates one or more analysis user interfaces (UIs) that visually indicates the importance of each token in the proposed title. Accordingly, once the analysis engine 208 determines the probability of each of the tokens, the UI module 212 generates the analysis UI that presents the results of the analysis. The analysis UI is then transmitted (e.g., via the communication module 206 and/or via the publication generator 124) to the client device 106 for display.

In one embodiment, the analysis UI may present a higher probability or importance token in a larger (font) size than a lower probability or importance token resulting, for example, in each token being a different size on the analysis UI. Alternatively, different colors may be used to distinguish the different probability or importance of each token. For example, a heatmap of the tokens in the proposed title may be used where "hotter" font colors indicate that the token is more likely to be searched for. Further still, recommended tokens (that are suggested for inclusion in the proposed title) identified by the recommendation module 210 may also be presented on the analysis UI. The recommended tokens may also be distinguished in size or color to indicate their probability or importance relative to the tokens that are in the proposed title. Additionally, a recommendation can also be included in the analysis UI to remove a token that is of low probability or importance. While size and color are used to distinguish each token, other visual cues can be used in alternative embodiments. Further still, a corresponding probability (score) for each token can be presented on the analysis UI.

In example embodiments, the user can revise the proposed title by selecting one or more of the recommended tokens for addition to the proposed title, removing one or more tokens from the proposed title, or a combination of both. Because the prediction model examines the structure or relationship between each token as well as their placement in the title, each change of a token (e.g., addition or removal) may affect the probability of the other tokens in the proposed title. With each addition or removal, the analysis engine 208 adjusts the results (in real-time) and the analysis UI is updated to reflect the new probability for each token in the revised title.

The modeling system 204 generates and updates a prediction model that is used by the analysis engine 208 during runtime. To enable these operations, the modeling system 204 comprises an access module 214, a pair generator, and a training engine 218.

The access module 214 accesses (e.g., retrieves, obtains, receives) historical data of users (e.g., buyers or searchers) and their search queries. The historical data also includes titles that were selected (e.g., clicked on) based on the search queries. The historical data may be stored, for example, at the databases 122 and accessed by the access module 214 via the database server 120.

The pair generator 216 generates data pairs using the historical data accessed by the access module 214. In example embodiments, the pair generator 216 pairs each search query with each title that is subsequently selected based on the search query. For example, user1 searched for "iPhone X" and selected "iPhone X free shipping" resulting in a first data pair, while user2 searched for "iPhone X" and selected "iPhone X case" resulting in a second data pair.

The training engine 218 trains (e.g., generates and maintains) the prediction model using these data pairs. In example embodiments, the prediction model learns structure of the titles and relationships between tokens (e.g., context) from the data pairs. For example, the prediction model may be trained to know that for a title "new Nike shoes," "new" is not important because most users search for "Nike shoes." However, the model is trained that for a title including "New Balance shoes," "new" in this context or structure is important since it is a part of a brand name. Further still, the training engine 218 trains the prediction model to identify importance of specific positions of tokens relative to each other. For instance, the model learns that for "iPhone" a number following "iPhone" is important (as it identifies a model number). In example embodiment, the model learns the positions and structures using neural networks. Examples of neural networks that can be used include recurrent neural networks and transformer-based neural networks.

To train the prediction model, the training engine 218 assigns query scores to each keyword or token in the selected titles of the data pair. In training, the queries scores are either 0 or 1 in accordance with example embodiments. However other embodiments may use different values or range of values. For example, in a first data pair, the user searched for "iPhone" and selected "Apple iPhone X." The input (e.g., title) into the prediction model for this example is "Apple iPhone X" and the corresponding query score assigned to each token is Apple=0, iPhone=1, and X=0. That is, because only "iPhone" was included in the search query, only "iPhone" receives a value of 1. In another data pair example, the search is for "iPhone X" and the user selected a title "iPhone X free shipping." In this example, the input into the prediction model is "iPhone X free shipping" and the applied query scores are iPhone=1, X=1, free=0, and shipping=0. Because "iPhone" and "X" were included in the search query, these terms are assigned a query score of 1, while the remaining tokens are assigned a query score of 0.

Once the query scores are assigned to the tokens, probabilities of tokens from titles of publications for similar items or content are determined. The probabilities may be determined for each token by averaging or determining a median of the query scores for the same token. Alternatively, the probabilities may be determined using other calculations or be weighted.

While the prediction system 118 is illustrated as having certain components in FIG. 2, the prediction system 118 may also comprise other components (not shown) that are not pertinent to example embodiments. Furthermore, any one or more of the components (e.g., engines, modules, generators) described herein may be implemented using hardware (e.g., a processor of a machine) or a combination of hardware and software. Moreover, any two or more of these components may be combined into a single component, and the functions described herein for a single component may be subdivided among multiple components.

Figure 3:
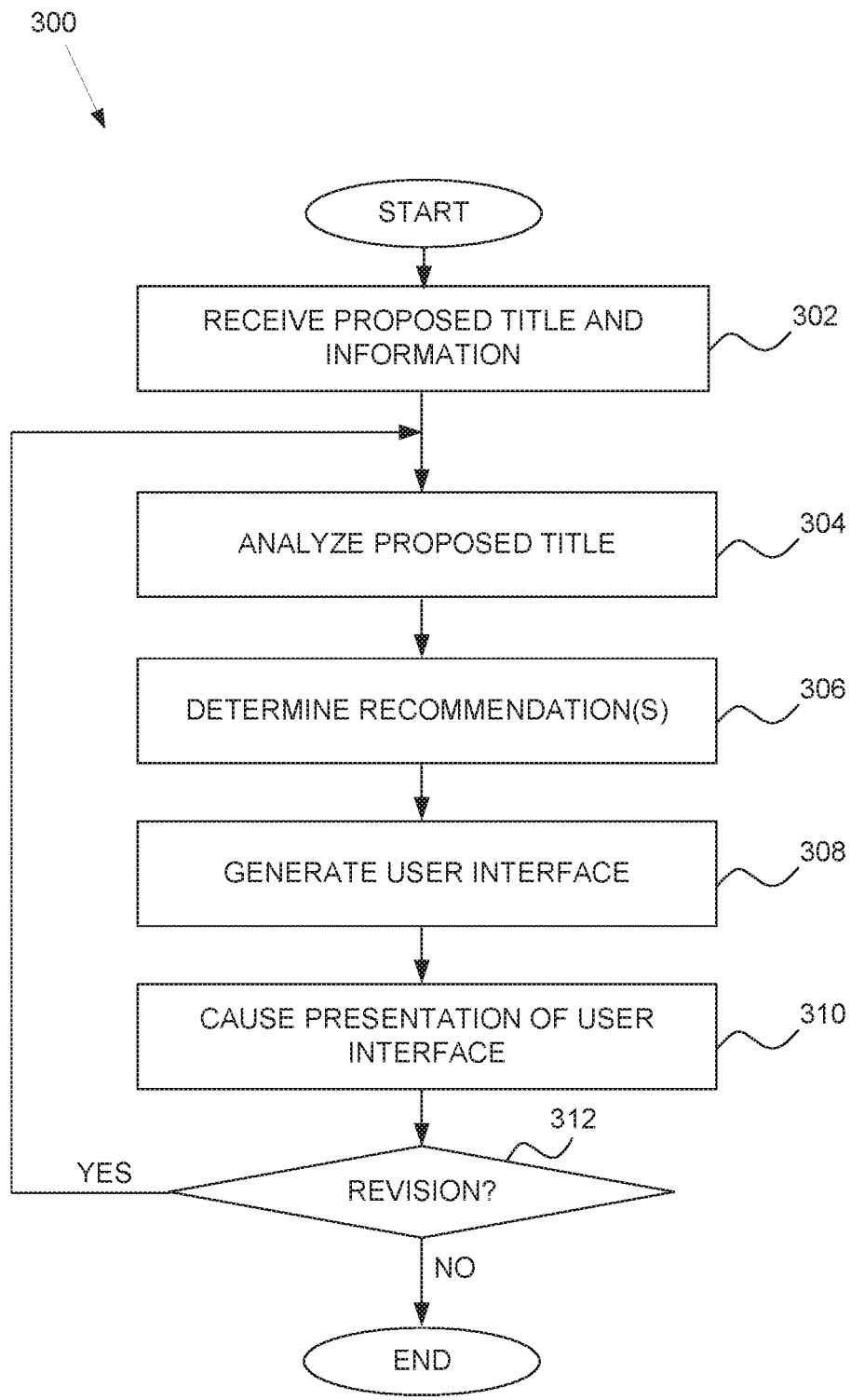
FIG. 3 is a block diagram illustrating a method for providing AI-based keyword predictions, according to some example embodiments.

FIG. 3 is a block diagram illustrating a method 300 for providing AI-based keyword predictions for a proposed title, according to some example embodiments. Operations in the method 300 may be performed by the prediction system 118 (e.g., the runtime system 202), using components described above with respect to FIG. 2. Accordingly, the method 300 is described by way of example with reference to the prediction system 118. However, it shall be appreciated that at least some of the operations of the method 300 may be deployed on various other hardware configurations or be performed by similar components residing elsewhere in the network environment 100. Therefore, the method 300 is not intended to be limited to the prediction system 118.

In operation 302, the communication module 206 receives a proposed title for a publication associated with an item. In example embodiments, the proposed title is received from the publication generator 124 which provides a user interface that enables a user at the client device 106 to enter information to generate the publication. The communication module 206 may also receive other information entered by the user including one or more images of the item and content or description of the item.

In operation 304, the analysis engine 208 analyzes the proposed title. In particular, the analysis engine 208 applies a prediction model to the proposed title that examines the structure and position of each token in the proposed title. Operation 304 will be discussed in more detail in connection with FIG. 4 below.

In operation 306, the recommendation module 210 determines recommendations for improving the proposed title. In some cases, the recommendation module 210 recommends one or more tokens that can be added to the proposed title. These tokens are recommended because they may have a high probability (e.g., probability score) or a higher probability then one or more tokens currently in the proposed title. The recommendation module 210 may also take into consideration a position (or relationship) of each recommended token relative to the propose title. For example, the recommendation module 210 may recommend that a user include "X" in a proposed title "iPhone case" and indicate that the "X" should be positioned after "iPhone."

In other cases, the recommendation module 210 may suggest removing one or more tokens in the proposed title. The recommendation to remove a token is based on a probability for the token being low or below a predetermined threshold. For example, a token having a probability less than 0.2 (on a scale of 0 to 1) may be recommended to be removed.

In operation 308, the UI module 212 generates an analysis user interface (UI) with results of the analysis. In example embodiments, the analysis UI visually indicates an importance of each token in the proposed title (e.g., a probability of each of the tokens). In one embodiment, the analysis UI may present a higher probability or importance token in a larger size than a lower probability or importance token which may result in each token being a different size on the analysis UI. Alternatively, different colors may be used to distinguish the different probability or importance of each token. Further still, the probability (score) for each token can be presented on the analysis UI.

The analysis UI also illustrates the recommendation(s) determined by the recommendation module 210. The recommended tokens may also be distinguished in size or color to indicate their corresponding probability or importance relative to the tokens that are in the proposed title. For example, a recommended token (that is suggested to be added to the proposed title) having a probability of 0.6 may be shown slightly larger in size than a token in the proposed title or another recommended token that has a probability of 0.5. The analysis UI may also indicate where the recommended token should be positioned in the title. For example, an arrow may lead from the recommended token to a position in the proposed title displayed on the analysis UI. In another example, the recommended token may be positioned in parenthesis or in a different color within the proposed title. Any visual cue to indicate the recommended token and/or a suggested position in the title may be used in various embodiments.

Additionally, a recommendation can also be included in the analysis UI to remove a token in the proposed title that is of low probability or importance. In some embodiments, the token recommended for removal may be visually distinguished to indicate the suggestion to remove the token. For example, the token recommended to be removed may be shown in a particular color (e.g., red) or an arrow shown removing the token from the proposed title. Other forms of visual cues to suggest removal of a token may also be used.

In operation 310, the network system 102 causes presentation of the analysis UI on the client device 106 of the user.

In operation 312, a determination is made as to whether the user makes a revision to the proposed title. In example embodiments, the user can revise the proposed title by selecting one or more the recommended tokens for addition to the proposed title, removing one or more tokens from the proposed title, or a combination of both. After each selection to add or remove a token, the method returns to operation 304. Because the prediction model examines the structure or relationship between each token as well as their placement in the title, each change of a token in the proposed title may affect the probability of the other tokens in the proposed title. Therefore, the analysis engine 208 adjusts the results (in real-time) and the analysis UI is updated to reflect the new probabilities for each token in the revised title.

If there are no further revisions, the method 300 ends. At this point, the publication generator 124 generates the publication and publishes the publication to the network.

Figure 4:
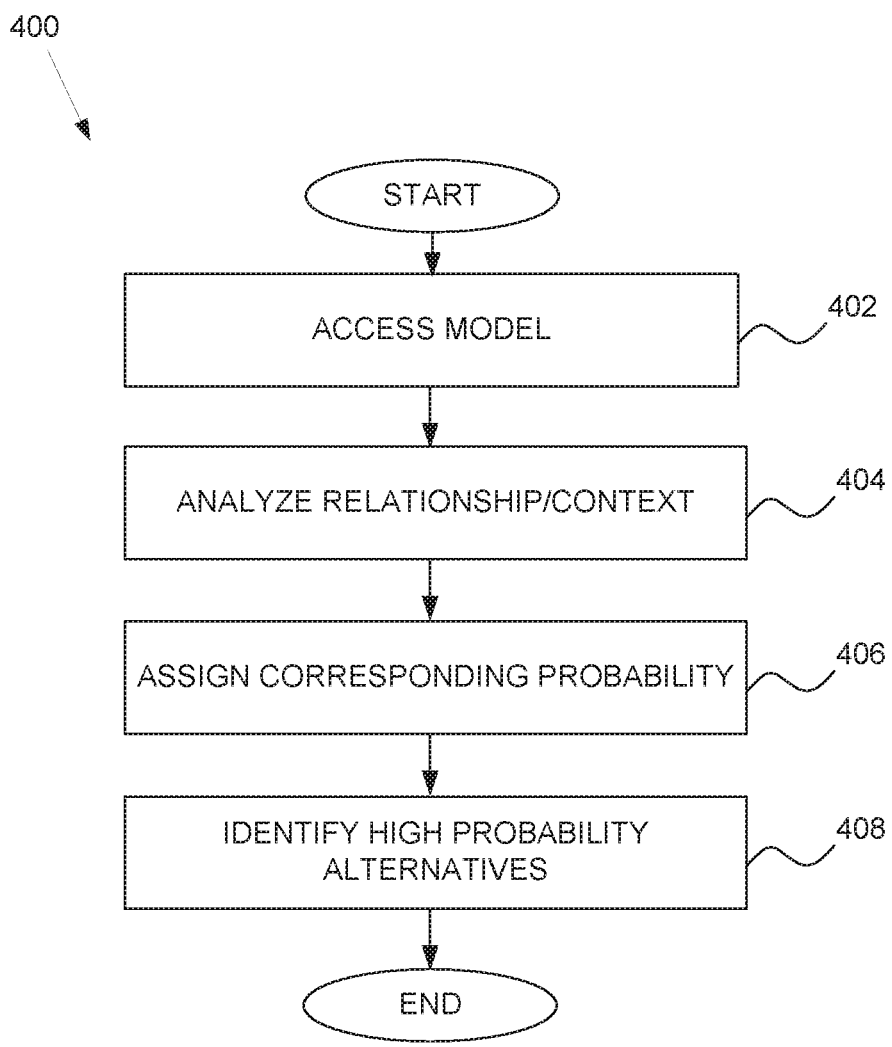
FIG. 4 is block diagram illustrating a method for analyzing a proposed title, according to some example embodiments.

FIG. 4 is block diagram illustrating a method 400 (e.g., operation 304) for analyzing a proposed title for a new publication, according to some example embodiments. Operations in the method 400 may be performed by the prediction system 118 (e.g., the runtime system 202), using components described above with respect to FIG. 2. Accordingly, the method 400 is described by way of example with reference to the prediction system 118. However, it shall be appreciated that at least some of the operations of the method 400 may be deployed on various other hardware configurations or be performed by similar components residing elsewhere in the network environment 100. Therefore, the method 400 is not intended to be limited to the prediction system 118.

In operation 402, the analysis engine 208 accesses the prediction model. The prediction model is maintained by the modeling system 204 and is periodically updated with more recent historical data. The prediction model may be stored in the prediction system 118 or elsewhere in the network system 102 (e.g., at the database 122).

Initially, the analysis engine 208 (or the prediction model) may convert the proposed title into a search query and/or remove stock words from the proposed title. After the stock words are removed, the prediction model is applied to the remaining tokens.

In operation 404, the prediction model is used to analyze relationships and context of tokens in the proposed title. The analysis of the relationships and context takes into consideration the item or content of the publication being generated. In some embodiments, the prediction model identifies an item or content of the publication that is being generated to find prediction data and probabilities for tokens of titles of publications for similar items or content. For example, users usually don't include "Apple" when searching for "IPhone." However, when searching for "Apple Watch," users will include "Apple" to distinguish the item being searched for from other watches. Therefore, "Apple" has less importance in the first example but is highly important in the second example. This context is used in assigning the corresponding probability or importance to each token in the proposed title and in determining recommendations to add or remove tokens. Thus, the prediction model looks at what tokens are being used and how they are structured in the proposed title as well as the item or content of the publications.

The prediction model can also deduce new tokens never seen before. For example, if the prediction model receives a title that includes "iPhone 12," the prediction model knows that for the structure iPhone #, # is very important. However, for a title that includes "12 iPhones Available," the 12 is of low importance since it merely refers to a quantity. Thus, the prediction model knows (e.g., is trained that) specific positions of tokens in the proposed title are important as well as context.

In operation 406, a corresponding probability is assigned to each token in the proposed title based on the relationship and context. For example, if the user entered a proposed title of "Apple iPhone X Case Free Shipping," "Apple" in this context is not very important since most users simply search for "iPhone" without "Apple" preceding it. Therefore, "Apple" may be assigned a probability of 0.25. "iPhone" is very important in the context of this proposed title, so the corresponding probability may be 0.85. "X" indicates a model number and is also important in the proposed title and may be assigned a probability of 0.7. However, "Free" and "Shipping" are not very important and may each be assigned a low probability (e.g., "Free"=0.2 and "Shipping"=0.15).

Continuing with the Apple Watch example, the user entered the proposed title "Apple Watch Series 4 Amazing." Because "Apple" is important in the context of this proposed title, the probability assigned to "Apple" may be 0.7. Similarly, "Watch" is important in the context of this proposed title and may be assigned a probability of 0.8. "Series" has medium importance and is assigned a probability of 0.5. Finally, "Amazing" is not very important and may be assigned a probability of 0.1. As such, each token in the proposed title is assigned a probability (e.g., score or value) between 0 and 1 based on context of the token in the proposed title. The probability indicates how likely the corresponding token will be searched for by further users of the network system 102.

In operation 408, the analysis engine 208 uses the prediction model to identify high probability alternatives. In example embodiments, the prediction model is configured to suggest other tokens based on similar titles, images, prices, or other item specific information. In some embodiments, the prediction model can identify similar titles or sets of tokens with similar structure and context based on keywords in the proposed title, comparable images of items in the publication, or other similar item or publication details. The prediction model then can identify tokens from these similar titles or sets of tokens having the similar structure and context that have high (or higher) probabilities. These tokens may then be used by the recommendation module 210 to suggest revisions to the proposed title (e.g., in operation 306).

For example, a proposed title is "Samsung Galaxy S9+ Free Shipping." The analysis engine 208 finds similar titles including "Samsung Galaxy S9 Plus Brand New" and "Samsung Galaxy S9 Plus Never Used." The prediction model may be applied to the tokens in the similar titles to identify tokens with probabilities that are higher than a threshold (e.g., 0.5). For example, the high probability tokens for both similar titles include "Galaxy," "S9," and "Plus." The recommendation module 210 may then check which of these high probability tokens are in the proposed title. In this example, "Plus" is missing. As such, the recommendation module 210 will recommend that the user add "Plus" to the proposed title. This will likely increase the number of times the proposed title will be found in searches since some of the users are searching for "Galaxy S9+" and some are searching for "Galaxy S9 Plus." If the user includes both of these tokens in the title (e.g., "Samsung Galaxy S9+ Plus"), the publication will get traffic from both of these types of users.

Figure 5:
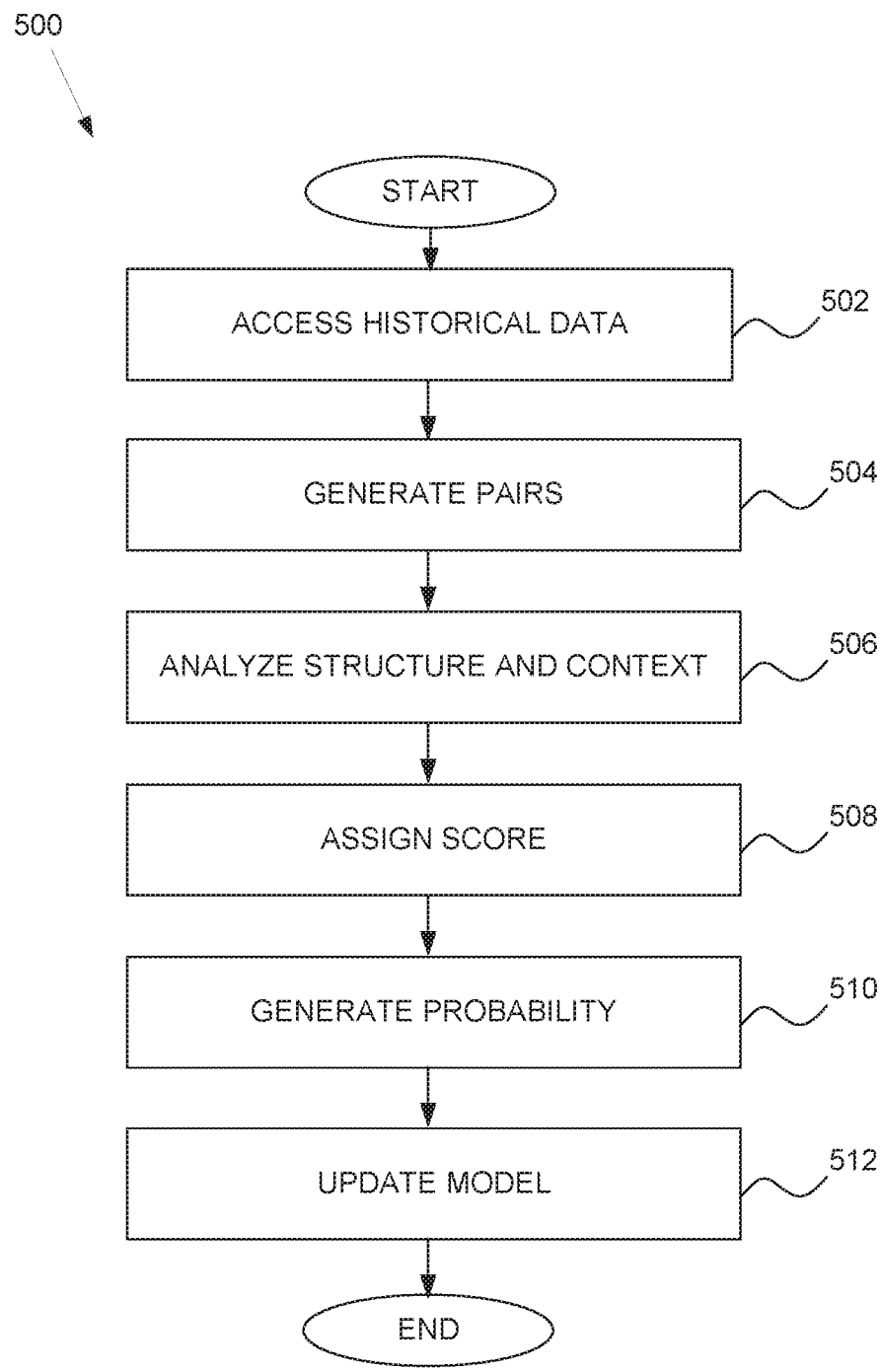
FIG. 5 is block diagram illustrating a method for generating the prediction model, according to some example embodiments.

FIG. 5 is block diagram illustrating a method 500 for generating the prediction model, according to some example embodiments. Operations in the method 500 may be performed by the prediction system 118 (e.g., the modeling system 204), using components described above with respect to FIG. 2. Accordingly, the method 500 is described by way of example with reference to the prediction system 118. However, it shall be appreciated that at least some of the operations of the method 500 may be deployed on various other hardware configurations or be performed by similar components residing elsewhere in the network environment 100. Therefore, the method 500 is not intended to be limited to the prediction system 118.

In operation 502, the access module 214 accesses historical data of users (e.g., buyers or searchers) and their search queries. The historical data may be stored, for example at the databases 122 and accessed by the access module 214 via the database server 120. The historical data may also include titles that were selected (e.g., clicked on) based on each search query. The historical data may be accessed periodically (e.g., at predetermined times or intervals of time), be triggered automatically by an event (e.g., when a certain amount of new historical data has been stored), or be manually triggered by an operator of the network system 102 in order to update the prediction model.

In operation 504, the pair generator 216 generates data pairs using the historical data accessed by the access module 214. In example embodiments, the pair generator 216 pairs a search query with each title that is subsequently selected. For example, user1 searched for "iPhone X" and selected "iPhone X free shipping" resulting in a data pair.

In operation 506, the training engine 218 analyzes structure and context of the data pairs in order to train (e.g., generate or update) the prediction model. In example embodiments, the prediction model learns the structures of the titles that were selected and relationships between tokens (e.g., context) in the titles for a particular item or content. For example, the prediction model may be trained to know that for a title "new Nike shoes," "new" is not important because most users search for "Nike shoes" (e.g., the item or content of the publication). However, the prediction model is trained that for a title including "New Balance shoes," "new" in this context or structure is important since it is a part of a brand name. Further still, the training engine 218 trains the prediction model to identify importance of specific positions of tokens relative to each other. For instance, the model learns that for "iPhone" a number following "iPhone" is important as it may identify a model number, but a number preceding "iPhone" may not be important (e.g., may simply be indicating a quantity). In example embodiments, the prediction model learns the positions and structures using neural networks.

In operation 508, the training engine 218 applies query scores to each token or keyword in the titles of the data pairs. In training, the queries scores are either 0 or 1 in accordance with example embodiments. For example, for a data pair, the user searched for "iPhone" and selected "Apple iPhone X." The input into the prediction model for this example is "Apple iPhone X" and the corresponding query score applied is Apple=0, iPhone=1, and X=0. In another data pair example, the search is for "iPhone X" and the user selected "iPhone X free shipping." The input into the prediction model is "iPhone X free shipping" and the applied query scores are iPhone=1, X=1, free=0, and shipping=0.

In operation 510, the training engine 218 generates a probability for each token based on the corresponding structure/context. In some embodiments, the probability is generated by averaging or taking a median of the query scores assigned to a same token for a same or similar structure/context (e.g., same or similar item or content). For example, in the context of "Apple Watch," the query scores for each token may be averaged to result in a probability of 0.7 for "Apple" and 0.8 for "Watch." Alternatively, in the context of "Apple iPhone X," the query scores for each token may be averaged to result in a probability of 0.2 for "Apple," 0.8 for "iPhone," and 0.7 for "X."

In operation 512, the training engine 218 updates the prediction model with current probabilities. The prediction model may then be stored for access and/or provided to the runtime system 202 for use.

While example embodiments apply a prediction model to determine probability for each token in the proposed title, alternative embodiments may use alternative means. For example, the analysis engine 208 may use one or more tables that maintain probabilities for various tokens. In this alternative embodiment, a lookup may be performed in the table(s) to find a corresponding probability for each token.

Figure 6:
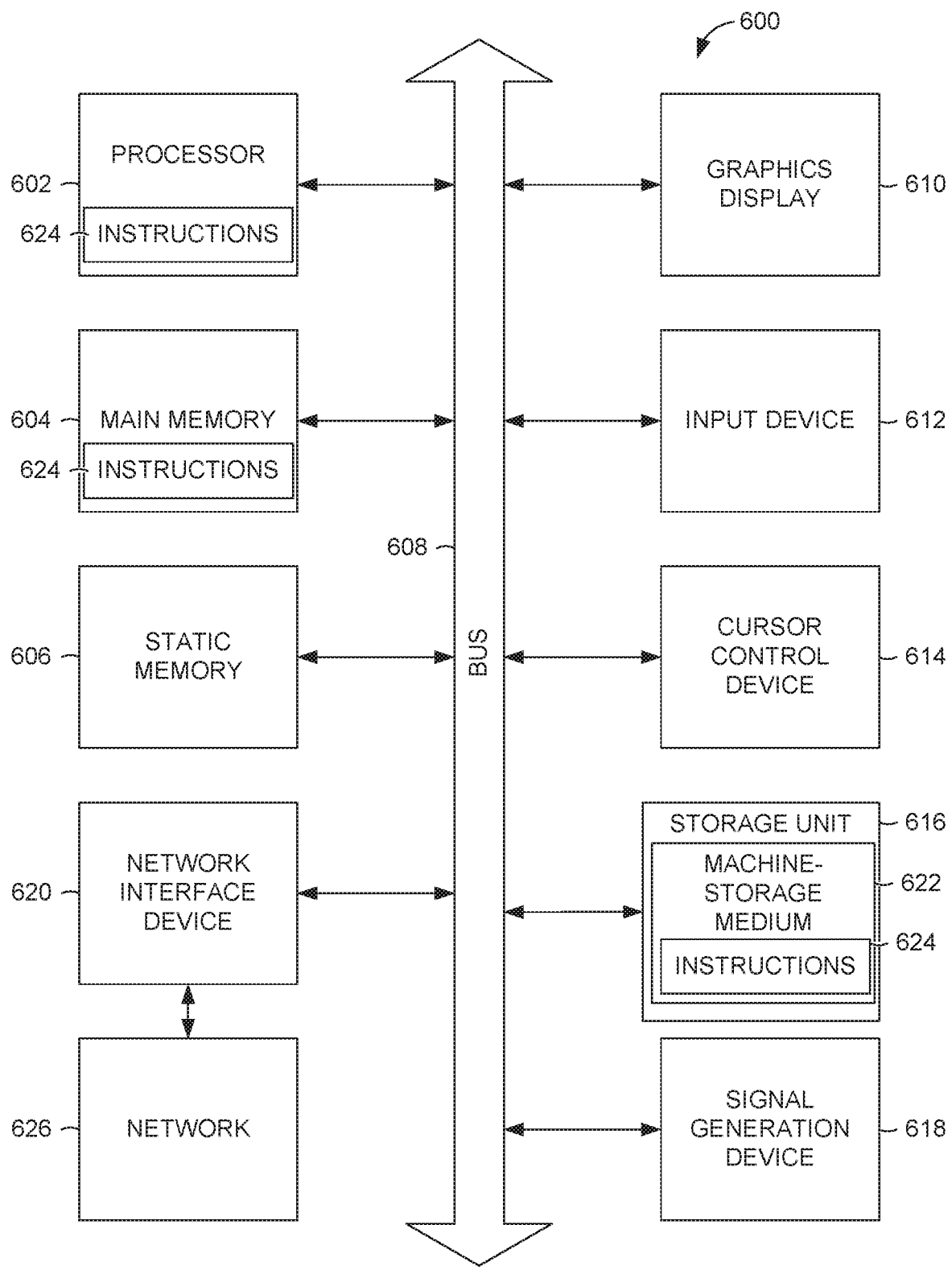
FIG. 6 is a block diagram illustrating components of a machine, according to some example embodiments, able to read instructions from a machine-storage medium and perform any one or more of the methodologies discussed herein.

FIG. 6 illustrates components of a machine 600, according to some example embodiments, that is able to read instructions from a machine-storage medium (e.g., a machine storage device, a non-transitory machine-readable storage medium, a computer storage medium, or any suitable combination thereof) and perform any one or more of the methodologies discussed herein. Specifically, FIG. 6 shows a diagrammatic representation of the machine 600 in the example form of a computer device (e.g., a computer) and within which instructions 624 (e.g., software, a program, an application, an applet, an app, or other executable code) for causing the machine 600 to perform any one or more of the methodologies discussed herein may be executed, in whole or in part.

For example, the instructions 624 may cause the machine 600 to execute the flowchart of FIG. 3 through FIG. 5. In one embodiment, the instructions 624 can transform the general, non-programmed machine 600 into a particular machine (e.g., specially configured machine) programmed to carry out the described and illustrated functions in the manner described.

In alternative embodiments, the machine 600 operates as a standalone device or may be connected (e.g., networked) to other machines. In a networked deployment, the machine 600 may operate in the capacity of a server machine or a client machine in a server-client network environment, or as a peer machine in a peer-to-peer (or distributed) network environment. The machine 600 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 624 (sequentially or otherwise) that specify actions to be taken by that machine. Further, while only a single machine is illustrated, the term "machine" shall also be taken to include a collection of machines that individually or jointly execute the instructions 624 to perform any one or more of the methodologies discussed herein.

The machine 600 includes a processor 602 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 604, and a static memory 606, which are configured to communicate with each other via a bus 608. The processor 602 may contain microcircuits that are configurable, temporarily or permanently, by some or all of the instructions 624 such that the processor 602 is configurable to perform any one or more of the methodologies described herein, in whole or in part. For example, a set of one or more microcircuits of the processor 602 may be configurable to execute one or more modules (e.g., software modules) described herein.

The machine 600 may further include a graphics display 610 (e.g., a plasma display panel (PDP), a light emitting diode (LED) display, a liquid crystal display (LCD), a projector, or a cathode ray tube (CRT), or any other display capable of displaying graphics or video). The machine 600 may also include an alphanumeric input device 612 (e.g., a keyboard), a cursor control device 614 (e.g., a mouse, a touchpad, a trackball, a joystick, a motion sensor, or other pointing instrument), a storage unit 616, a signal generation device 618 (e.g., a sound card, an amplifier, a speaker, a headphone jack, or any suitable combination thereof), and a network interface device 620.

The storage unit 616 includes a machine-storage medium 622 (e.g., a tangible machine-readable storage medium) on which is stored the instructions 624 (e.g., software) embodying any one or more of the methodologies or functions described herein. The instructions 624 may also reside, completely or at least partially, within the main memory 604, within the processor 602 (e.g., within the processor's cache memory), or both, before or during execution thereof by the machine 600. Accordingly, the main memory 604 and the processor 602 may be considered as machine-readable media (e.g., tangible and non-transitory machine-readable media). The instructions 624 may be transmitted or received over a network 626 via the network interface device 620.

In some example embodiments, the machine 600 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

Executable Instructions and Machine-Storage Medium

The various memories (i.e., 604, 606, and/or memory of the processor(s) 602) and/or storage unit 616 may store one or more sets of instructions and data structures (e.g., software) 624 embodying or utilized by any one or more of the methodologies or functions described herein. These instructions, when executed by processor(s) 602 cause various operations to implement the disclosed embodiments.

As used herein, the terms "machine-storage medium," "device-storage medium," "computer-storage medium" (referred to collectively as "machine-storage medium 622") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 622 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media 622 specifically exclude carrier waves, modulated data signals, and other such media, at least some of which are covered under the term "signal medium" discussed below. In this context, the machine-storage medium is non-transitory.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 624 may further be transmitted or received over a communications network 626 using the transmission medium via the network interface device 620 and utilizing any one of a number of well-known transfer protocols (e.g., HTTP). Examples of communication networks 626 include a local area network (LAN), a wide area network (WAN), the Internet, mobile telephone networks, plain old telephone service (POTS) networks, and wireless data networks (e.g., WiFi, LTE, and WiMAX networks). The term "transmission medium" shall be taken to include any intangible medium that is capable of storing, encoding, or carrying instructions 624 for execution by the machine 600, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-storage medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured by software to become a special-purpose processor, the general-purpose processor may be configured as respectively different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

EXAMPLES

Example 1 is a method for managing keyword predictions for proposed titles. The method comprises receiving, by a network system, a proposed title for a publication from a user during a publication creation process, the proposed title comprising a plurality of tokens and the publication being associated with an item, the plurality of tokens comprising at least all non-stock words in the proposed title; based on the proposed title, identifying, using a hardware processor of the network system, an importance of each token of the plurality of tokens in the proposed title; and causing presentation, by the network system, of a user interface that visually indicates the importance of each token of the plurality of tokens in the proposed title.

In example 2, the subject matter of example 1 can optionally include wherein the importance of a token is based on a probability that other users will include the token in their search query for similar items to the item.

In example 3, the subject matter of any of examples 1-2 can optionally include wherein the causing presentation comprises presenting a higher importance token in a larger size than a lower importance token.

In example 4, the subject matter of any of examples 1-3 can optionally include wherein the causing presentation comprises including a recommendation to remove a token with low importance from the proposed title.

In example 5, the subject matter of any of examples 1-4 can optionally include wherein the causing presentation comprises including a recommendation to add a new token to the proposed title.

In example 6, the subject matter of any of examples 1-5 can optionally include receiving an indication to add the new token to the proposed title; and updating the importance of each token in the proposed title based on the addition of the new token.

In example 7, the subject matter of any of examples 1-6 can optionally include wherein the identifying the importance comprises using a prediction model to predict a probability for each token based on likelihood that other users will include each of the tokens in their search query for items similar to the item, the importance being based on the probability.

In example 8, the subject matter of any of examples 1-7 can optionally include generating the prediction model, the generating comprising collecting historical data of search queries and titles selected in response to the search queries, a search query and title selected in response to the search query forming a data pair; and training the prediction model using the data pair, the training including learning a structure of the tokens in the titles of the data pair using a neural network.

Example 9 is a system for managing keyword predictions for proposed titles. The system includes one or more hardware processors and a memory storing instructions that, when executed by the one or more hardware processors, causes the one or more hardware processors to perform operations comprising receiving, by a network system, a proposed title for a publication from a user during a publication creation process, the proposed title comprising a plurality of tokens and the publication being associated with an item, the plurality of tokens comprising at least all non-stock words in the proposed title; based on the proposed title, identifying an importance of each token of the plurality of tokens in the proposed title; and causing presentation, by the network system, of a user interface that visually indicates the importance of each token of the plurality of tokens in the proposed title.

In example 10, the subject matter of example 9 can optionally include wherein the importance of a token is based on a probability that other users will include the token in their search query for similar items to the item.

In example 11, the subject matter of any of examples 9-10 can optionally include wherein the causing presentation comprises presenting a higher importance token in a larger size than a lower importance token.

In example 12, the subject matter of any of examples 9-11 can optionally include wherein the causing presentation comprises including a recommendation to remove a token with low importance from the proposed title.

In example 13, the subject matter of any of examples 9-12 can optionally include wherein the causing presentation comprises including a recommendation to add a new token to the proposed title.

In example 14, the subject matter of any of examples 9-13 can optionally include receiving an indication to add the new token to the proposed title; and updating the importance of each token in the proposed title based on the addition of the new token.

In example 15, the subject matter of any of examples 9-14 can optionally include wherein the identifying the importance comprises using a prediction model to predict a probability for each token based on likelihood that other users will include each of the tokens in their search query for items similar to the item, the importance being based on the probability.

In example 16, the subject matter of any of examples 9-15 can optionally include generating the prediction model, the generating comprising collecting historical data of search queries and titles selected in response to the search queries, a search query and title selected in response to the search query forming a data pair; and training the prediction model using the data pair, the training including learning a structure of the tokens in the titles of the data pair using a neural network.

Example 17 is a machine-storage medium for managing keyword predictions for proposed titles. The machine-storage medium configures one or more processors to perform operations comprising receiving, by a network system, a proposed title for a publication from a user during a publication creation process, the proposed title comprising a plurality of tokens and the publication being associated with an item, the plurality of tokens comprising at least all non-stock words in the proposed title; based on the proposed title, identifying an importance of each token of the plurality of tokens in the proposed title; and causing presentation, by the network system, of a user interface that visually indicates the importance of each token of the plurality of tokens in the proposed title.

In example 18, the subject matter of example 17 can optionally include wherein the causing presentation comprises including a recommendation to remove a token with low importance from the proposed title.

In example 19, the subject matter of any of examples 17-18 can optionally include wherein the causing presentation comprises including a recommendation to add a new token to the proposed title.

In example 20, the subject matter of any of examples 17-19 can optionally include wherein the identifying the importance comprises using a prediction model to predict a probability for each token based on likelihood that other users will include each of the tokens in their search query for items similar to the item, the importance being based on the probability.

Some portions of this specification may be presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the present subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and datastores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:
    receiving, by a network system, a proposed title for a publication from a user during a publication creation process, the proposed title comprising a plurality of tokens and the publication being associated with an item, each token of the plurality of tokens representing a non-stock word in the proposed title;
    analyzing the proposed title by applying a prediction model to the proposed title, the prediction model being trained to identify an importance of a specific position of each token relative to other tokens in proposed titles in order to determine an importance of each token, whereby tokens that are the same token in a same position have a different importance from each other for different corresponding items or tokens that are the same token and in different positions for a same item have a different importance from each other, the analyzing including:
        identifying the item or content of the publication that is being generated;
        based on the item or content, identifying context and probabilities for tokens of titles of publications for similar items or content;
        identifying a specific position of each token relative to other tokens in the proposed title;
        examining a relationship between each token of the plurality of tokens and the specific position of each token relative to the other tokens in the proposed title in order to determine the importance of each token based on the item or content, a combination of the relationship and the specific position of each token relative to the other tokens affecting a probability assigned to each token; and
    assigning, using a hardware processor of the network system, the probability to each token of the plurality of tokens in the proposed title from the identified probabilities based on the relationship and the specific position of each token in the proposed title relative to the other tokens in the title and the context for the tokens of the titles of publications for the similar items or content; and
    causing presentation, by the network system, of a user interface that visually indicates the importance of each token of the plurality of tokens in the proposed title and presents the probability for each token.

2. The method of claim 1, wherein the probability of a token is based on a probability that other users will include the token in their search query for similar items to the item.

3. The method of claim 1, wherein the causing presentation of the user interface that visually indicates the importance comprises presenting a higher importance token in a larger size than a lower importance token.

4. The method of claim 1, further comprising:
    causing presentation of a recommendation to remove a token with low importance from the proposed title, the recommendation to remove the token being based on the token having a probability below a predetermined threshold.

5. The method of claim 1, further comprising:
causing presentation of a recommendation to add a new token to the proposed title and an indication of a position within the proposed title where the new token should be inserted, wherein the new token has a higher probability than at least one of the plurality of tokens in the proposed title, and the causing presentation of the indication of the position comprises causing display of an arrow leading from the new token to the position in the proposed title where the new token should be inserted.

6. The method of claim 1, further comprising:
causing presentation of a recommendation to add a new token to the proposed title and an indication of a position within the proposed title where the new token should be inserted;
receiving an indication to add the new token to the proposed title; and
updating the probability of each token in the proposed title based on the addition of the new token.

7. The method of claim 1, wherein the probability for each token is generated by a prediction model.

8. The method of claim 7, further comprising generating the prediction model, the generating comprising:
accessing historical data of search queries and titles selected in response to the search queries;
generating data pairs by pairing a search query with each title selected in response to the search query;
analyzing structure and context of the data pairs, the analyzing comprising learning structures of each title and relationships between tokens in each title for a particular item or content;
assigning a query score to each token in each title of each data pair;
learning a structure and context of the tokens in the titles of the data pairs using a neural network;
generating a current probability for each token based on the structure and context by averaging or determining a median of query scores for a same token; and
updating the prediction model with the current probabilities.

9. A system comprising:
one or more hardware processors; and
a memory storing instructions that, when executed by the one or more hardware processors, causes the one or more hardware processors to perform operations comprising:
receiving, by a network system, a proposed title for a publication from a user during a publication creation process, the proposed title comprising a plurality of tokens and the publication being associated with an item, each token of the plurality of tokens representing a non-stock word in the proposed title;
analyzing the proposed title by applying a prediction model to the proposed title, the prediction model being trained to identify an importance of a specific position of each token relative to other tokens in proposed titles in order to determine an importance of each token, whereby tokens that are the same token in a same position have a different importance from each other for different corresponding items or tokens that are the same token and in different positions for a same item have a different importance from each other, the analyzing including:
identifying the item or content of the publication that is being generated;
based on the item or content, identifying context and probabilities for tokens of titles of publications for similar items or content;
identifying a specific position of each token relative to other tokens in the proposed title;
examining a relationship between each token of the plurality of tokens and the specific position of each token relative to the other tokens in the proposed title in order to determine the importance of each token based on the item or content, a combination of the relationship and the specific position of each token relative to the other tokens affecting a probability assigned to each token; and
assigning the probability to each token of the plurality of tokens in the proposed title from the identified probabilities based on the relationship and the position of each token in the proposed title relative to the other tokens in the title and the context for the tokens of the titles of publications for the similar items or content; and
causing presentation, by the network system, of a user interface that visually indicates the importance of each token of the plurality of tokens in the proposed title and presents the probability for each token.

10. The system of claim 9, wherein the probability of a token is based on a probability that other users will include the token in their search query for similar items to the item.

11. The system of claim 9, wherein the causing presentation of the user interface that visually indicates the importance comprises presenting a higher importance token in a larger size than a lower importance token.

12. The system of claim 9, wherein the operations further comprise:
causing presentation of a recommendation to remove a token with low importance from the proposed title, the recommendation to remove the token being based on the token having a probability below a predetermined threshold.

13. The system of claim 9, further comprising:
causing presentation of a recommendation to add a new token to the proposed title and an indication of a position within the proposed title where the new token should be inserted, wherein the new token has a higher probability than at least one of the plurality of tokens in the proposed title, and the causing presentation of the indication of the position comprises causing display of an arrow leading from the new token to the position in the proposed title where the new token should be inserted.

14. The system of claim 9, wherein the operations further comprise:
causing presentation of a recommendation to add a new token to the proposed title and an indication of a position within the proposed title where the new token should be inserted;
receiving an indication to add the new token to the proposed title; and
updating the probability of each token in the proposed title based on the addition of the new token.

15. The system of claim 9, wherein the probability for each token is generated by a prediction model.

16. The system of claim 15, wherein the operations further comprise generating the prediction model, the generating comprising:
accessing historical data of search queries and titles selected in response to the search queries;

generating data pairs by pairing a search query with each title selected in response to the search query;

analyzing structure and context of the data pairs, the analyzing comprising learning structures of each title and relationships between tokens in each title for a particular item or content;

assigning a query score to each token in each title of each data pair;

learning a structure and context of the tokens in the titles of the data pairs using a neural network;

generating a current probability for each token based on the structure and context by averaging or determining a median of query scores for a same token; and training the prediction model using the data pair, the training including learning a structure of the tokens in the titles of the data pair using a neural network.

17. A machine-storage medium storing instructions that, when executed by one or more processors of a machine, cause the one or more processors to perform operations comprising:

receiving, by a network system, a proposed title for a publication from a user during a publication creation process, the proposed title comprising a plurality of tokens and the publication being associated with an item, each token of the plurality of tokens representing a non-stock word in the proposed title;

analyzing the proposed title by applying a prediction model to the proposed title, the prediction model being trained to identify an importance of a specific position of each token relative to other tokens in proposed titles in order to determine an importance of each token, whereby tokens that are the same token in a same position have a different importance from each other for different corresponding items or tokens that are the same token and in different positions for a same item have a different importance from each other, the analyzing including:

identifying the item or content of the publication that is being generated;

based on the item or content, identifying context and probabilities for tokens of publications for similar items or content;

identifying a specific position of each token relative to other tokens in the proposed title;

examining a relationship between each token of the plurality of tokens and the specific position of each token relative to the other tokens in the proposed title in order to determine the importance of each token based on the item or content, a combination of the relationship and the specific position of each token relative to the other tokens affecting a probability assigned to each token; and assigning the probability to each token of the plurality of tokens in the proposed title from the identified probabilities based on the relationship and the position of each token in the proposed title relative to the other tokens in the title and the context for the tokens of the titles of publications for the similar items or content; and causing presentation, by the network system, of a user interface that visually indicates the importance of each token of the plurality of tokens in the proposed title and presents the probability for each token.

18. The machine-storage medium of claim 17, wherein the operations further comprise:

causing presentation of a recommendation to remove a token with low importance from the proposed title, the recommendation to remove the token being based on the token having a probability below a predetermined threshold.

19. The machine-storage medium of claim 17, wherein the operations further comprise:

causing presentation of a recommendation to add a new token to the proposed title and an indication of a position within the proposed title where the new token should be inserted, wherein the causing presentation of the indication of the position comprises causing display of the new token positioned in parenthesis or in a different color within the proposed title.

20. The machine-storage medium of claim 17, wherein the probability for each token is generated by a prediction model.

\* \* \* \* \*